US010968960B2

(12) United States Patent
Asada et al.

(10) Patent No.: US 10,968,960 B2
(45) Date of Patent: Apr. 6, 2021

(54) TRANSMISSION

(71) Applicant: UNIVANCE CORPORATION, Kosai (JP)

(72) Inventors: Yoshihiro Asada, Kosai (JP); Kensuke Suzuki, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 674 days.

(21) Appl. No.: 15/746,915

(22) PCT Filed: Jul. 24, 2015

(86) PCT No.: PCT/JP2015/071093
§ 371 (c)(1),
(2) Date: Jan. 23, 2018

(87) PCT Pub. No.: WO2017/017724
PCT Pub. Date: Feb. 2, 2017

(65) Prior Publication Data
US 2020/0088241 A1 Mar. 19, 2020

(51) Int. Cl.
*F16H 3/083* (2006.01)
*F16H 3/089* (2006.01)
(Continued)

(52) U.S. Cl.
CPC .............. *F16D 11/10* (2013.01); *F16D 23/02* (2013.01); *F16D 11/14* (2013.01);
(Continued)

(58) Field of Classification Search
CPC .......... F16H 3/083; F16H 3/089; F16D 11/10; F16D 2023/0656; F16D 2023/0625; F16D 2023/0631; F16D 2023/0637
(Continued)

(56) References Cited

U.S. PATENT DOCUMENTS 5,651,435 A * 7/1997 Perosky .................. F16D 23/06
192/219
5,887,688 A * 3/1999 Ploetz ..................... F16D 23/06
192/53.34
(Continued)

FOREIGN PATENT DOCUMENTS

JP 2012-127471 A 7/2012

OTHER PUBLICATIONS

Notification Concerning Transmittal of International Preliminary Report on Patentability (Form PCT/IB/326) issued in counterpart International Application No. PCT/JP2015/071093 dated Feb. 8, 2018, with Forms PCT/IB/373, PCT/IB/338 and PCT/ISA/237. (11 pages).
(Continued)

*Primary Examiner* — Ha Dinh Ho
(74) *Attorney, Agent, or Firm* — Westerman, Hattori, Daniels & Adrian, LLP

(57) ABSTRACT

Provided is a transmission which eliminates torque loss during gear shift and with which the processing of components can be simplified. An axial force is generated in a protrusion by means of a first portion during gear shift from a low gear to a high gear, and when a low-speed transmission gear and a clutch ring separate from each other, a high speed transmission gear and the clutch ring interlock. Since relative movement of the protrusion in a neutral direction is suppressed by means of a first retaining portion during coasting, gear disengagement whereby the transmission gears and the clutch ring separate from each other can be suppressed. Since the first retaining portion can be formed in a first wall when providing a groove portion, an increase in the component processing workload can be suppressed.

8 Claims, 11 Drawing Sheets

(51) Int. Cl.
    *F16D 23/06*     (2006.01)
    *F16D 11/10*     (2006.01)
    *F16D 23/02*     (2006.01)
    *F16D 11/14*     (2006.01)
    *F16D 11/00*     (2006.01)

(52) U.S. Cl.
    CPC ............... *F16D 2011/008* (2013.01); *F16D 2023/0625* (2013.01); *F16D 2023/0656* (2013.01); *F16H 3/083* (2013.01); *F16H 3/089* (2013.01)

(58) Field of Classification Search
    USPC .................................................. 74/325, 339
    See application file for complete search history.

(56) References Cited

U.S. PATENT DOCUMENTS

| | | | | |
|---|---|---|---|---|
| 9,638,315 B2* | 5/2017 | Kelly | ............... | F16H 61/0403 |
| 9,810,271 B2* | 11/2017 | Shiotsu | ............... | F16H 3/30 |
| 2013/0228027 A1* | 9/2013 | Ikeya | ............... | B60W 10/06 |
| | | | | 74/331 |

OTHER PUBLICATIONS

Extended Search Report dated Mar. 15, 2019, issued in counterpart EP Application No. 15899558.9 (7 pages).
International Search Report dated Oct. 13, 2015, issued in counterpart International Application No. PCT/JP2015/071093 (1 page).

* cited by examiner

TRANSMISSION

TECHNICAL FIELD

The present invention relates to a transmission. More specifically, the present invention relates to a transmission with which the processing of components can be simplified.

BACKGROUND ART

A transmission that has a plurality of transmission gears in which drive gears and driven gears engage each other has been known (Patent Literature 1). In the technique disclosed in Patent Literature 1, a plurality of hubs (clutch cam rings) are fixed to shafts, and clutch rings with clutch teeth are respectively disposed on the outer circumferences of the hubs. Inclining surfaces that incline with respect to the axial direction are formed with respect to each hub, and protrusions that protrude in the radial direction to abut on the inclining surfaces are disposed on each clutch ring. In this transmission, the clutch ring is moved in the axial direction, so that the clutch teeth of the drive gear or the driven gear (the transmission gear) and the clutch teeth of the clutch ring are engaged with each other to perform gear shift. To prevent gear disengagement whereby the clutch ring unintentionally moves in the axial direction, the clutch teeth are provided with surfaces that incline from the tooth ends toward the tooth bases so that the tooth thickness of the tooth bases is smaller than the tooth thickness of the tooth ends.

When the clutch teeth of two clutch rings simultaneously engage the clutch teeth of two transmission gears having different gear ratios during gear shift from a low gear to a high gear, a force in the rotational direction is changed by the inclining surfaces to a force in the axial direction that acts on the protrusions, so that the protrusions of the clutch ring that engages the low-speed transmission gear having the number of rotations lower than that of the high-speed transmission gear are pushed out in the axial direction by internal circulation torque. When the high-speed transmission gear is coupled to the shaft, engagement of the low-speed transmission gear and the clutch ring are released from each other (the high gear is established), so that torque loss during gear shift can be eliminated.

CITATION LIST

Patent Literature

[Patent Literature 1] JP-A No. 2012-127471

SUMMARY OF INVENTION

Technical Problem

However, in the technique disclosed in Patent Literature 1, the processing for disposing the inclining surfaces with respect to the clutch teeth is required to prevent gear disengagement.

The present invention has been made to address the above problem, and an object of the present invention is to provide a transmission with which the processing of components can be simplified while gear disengagement can be prevented.

Solution to Problem and Advantageous Effects of Invention

To achieve this object, according to a transmission of a first aspect, a second shaft is disposed along a first shaft to which power is inputted, a drive gear is disposed on the first shaft, and a driven gear is disposed on the second shaft, the drive gear and the driven gear engaging each other. In each of a plurality of transmission gears, the drive gear is relatively rotatable with respect to the first shaft or the driven gear is relatively rotatable with respect to the second shaft. A plurality of hubs that are each relatively unrotatable with respect to the first shaft or the second shaft are each disposed on the first shaft so as to be aligned with the drive gear or on the second shaft so as to be aligned with the driven gear. A clutch ring is mounted on each of the hubs so as to be relatively movable in the axial direction. The clutch ring is moved in the axial direction by an operating portion, interlocks the drive gear or the driven gear with the hub at a first position in the axial direction, and moves from the first position to a second position in the axial direction to separate the drive gear or the driven gear and the hub from each other. One of the hub and the clutch ring has a protrusion in the radial direction, and the other of the hub and the clutch ring is formed with a groove portion in which the protrusion relatively moves in the rotational direction and in the axial direction. The groove portion has a first wall and a second wall that is opposite to the first wall in the rotational direction, the second wall and the first wall abutting on the protrusion to integrally rotate the hub and the clutch ring. The first wall has a first portion and a first retaining portion.

When the clutch rings simultaneously interlock with two transmission gears having different gear ratios during gear shift from a low gear to a high gear, a force in the axial direction from the first position toward the second position is generated in the protrusion by the first portion that inclines with respect to the axial direction, so that the clutch ring that interlocks with the low-speed transmission gear having the number of rotations lower than that of the high-speed transmission gear is pushed out in the axial direction by internal circulation torque. When the high-speed transmission gear and the clutch ring interlock, the low-speed transmission gear and the clutch ring separate from each other, so that torque loss during gear shift can be eliminated. Relative movement of the protrusion from the first position toward the second position during coasting in which power is transmitted from the driven gear to the drive gear is prevented by the first retaining portion. Thus, gear disengagement whereby the transmission gear and the clutch ring separate from each other during coasting can be prevented. The processing for preventing gear disengagement, for example, the processing for disposing slant surfaces with respect to the transmission gears and to the clutch teeth of the clutch rings can be unnecessary, so that the processing of components can be simplified while gear disengagement during coasting can be prevented.

According to the transmission of a second aspect, a second portion of the second wall inclines with respect to the axial direction, and generates a force in the axial direction from the second position toward the first position in the protrusion. A second retaining portion that is joined to the second portion inclines with respect to the axial direction, and generates a force in the axial direction from the second position toward the first position in the protrusion during drive traveling in which power is transmitted from the drive gear to the driven gear. Since the force in the axial direction from the second position toward the first position is generated in the protrusion by the second retaining portion during drive traveling, gear disengagement whereby the transmission gear and the clutch ring separate from each other during drive traveling can be prevented. The processing for preventing gear disengagement, for example, the processing for disposing slant surfaces with respect to the transmission gears and to the clutch teeth of the clutch rings can be unnecessary, so that in addition to the effect of the first aspect, the processing of components can be simplified while gear disengagement during drive traveling can be prevented.

According to the transmission of a third aspect, the second retaining portion is disposed so that a boundary between the second portion and the second retaining portion is located toward the second position in the axial direction from a boundary between the first portion and the first retaining portion. When the protrusion that is located on the boundary between the second portion and the second retaining portion moves in the rotational direction during drive traveling, the protrusion is located at the first portion, so that the clutch ring can be easily pushed out in the axial direction by moving the protrusion along the first portion. Thus, in addition to the effect of the second aspect, gear shift can be performed smoothly.

According to the transmission of a fourth aspect, the position in the axial direction of the protrusion when the clutch ring is moved closest to the drive gear or the driven gear by the operating portion is set to be the same as the position in the axial direction of the first retaining portion. A biasing force in the axial direction from the second position toward the first position is provided to the clutch ring by a biasing portion of the operating portion during drive traveling in which power is transmitted from the drive gear to the driven gear. The second portion inclines with respect to the axial direction so as to generate a force in the axial direction from the second position toward the first position in the protrusion, so that in addition to the effect of one of the first to third aspects, the biasing force of the biasing portion can less likely to cause gear disengagement.

DESCRIPTION OF EMBODIMENTS

Figure 1:
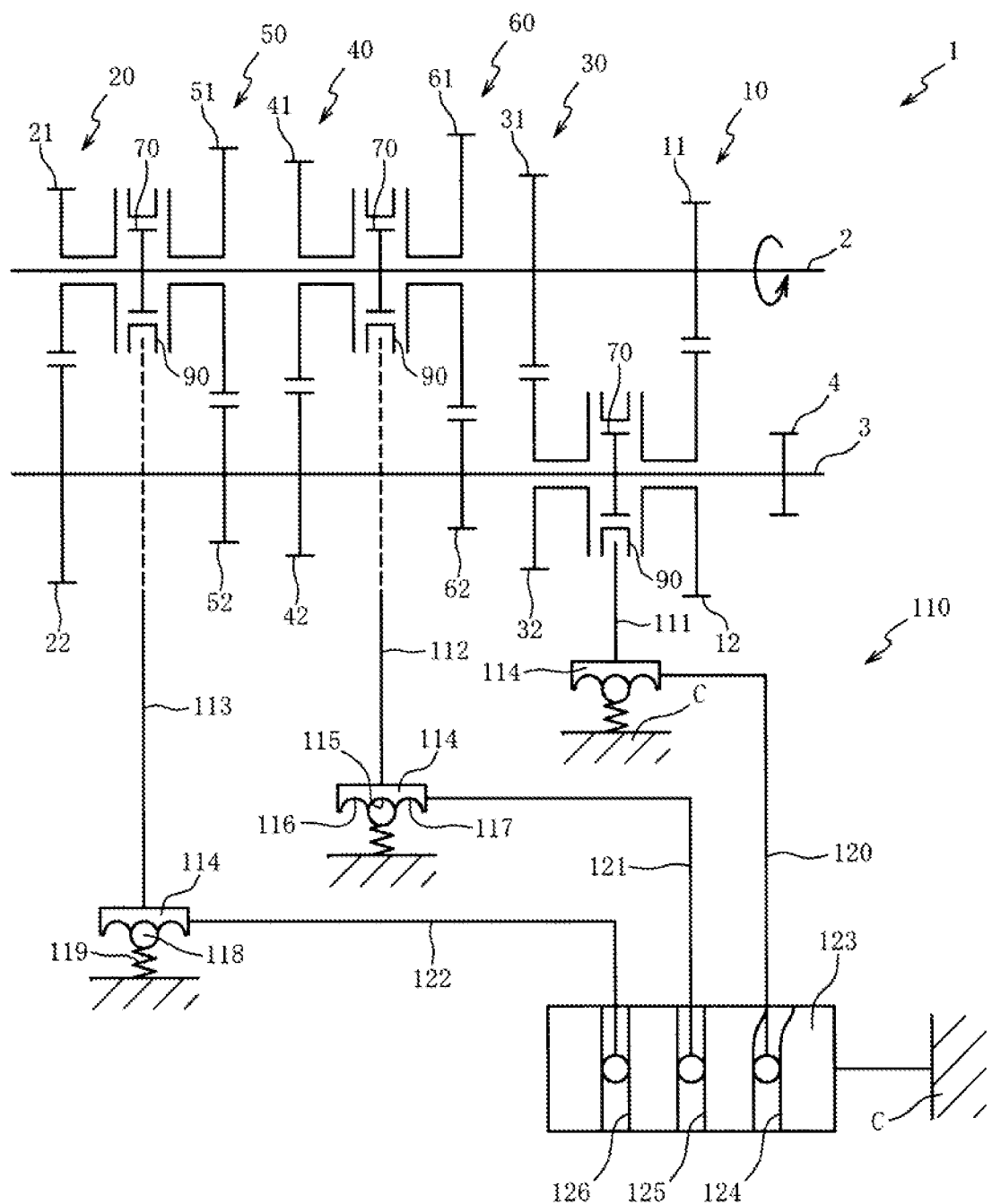
FIG. 1 is a skeleton diagram of a transmission according to a first embodiment of the present invention.

Hereinafter, preferred embodiments of the present invention will be described with reference to the accompanying drawings. First, the schematic configuration of a transmission 1 according to a first embodiment of the present invention will be described with reference to FIG. 1. FIG. 1 is a skeleton diagram of the transmission 1 according to the first embodiment. The transmission 1 has a first shaft 2 (a drive shaft) to which power is inputted, and a second shaft 3 (an output shaft) disposed in parallel with the first shaft 2, an output gear 4 being disposed on the second shaft 3. The first shaft 2 and the second shaft 3 support a plurality of transmission gears including a first speed gear 10, a second speed gear 20, a third speed gear 30, a fourth speed gear 40, a fifth speed gear 50, and a sixth speed gear 60. In this embodiment, the transmission 1 is mounted on an automobile (not illustrated).

The first speed gear 10 has a drive gear 11 that is relatively unrotatably fixed to the first shaft 2, and a driven gear 12 that is relatively rotatably fixed to the second shaft 3 and that engages the drive gear 11, and the second speed gear 20 has a drive gear 21 that is relatively rotatably fixed to the first shaft 2, and a driven gear 22 that is relatively unrotatably fixed to the second shaft 3 and that engages the drive gear 21. The third speed gear 30 has a drive gear 31 that is relatively unrotatably fixed to the first shaft 2, and a driven gear 32 that is relatively rotatably fixed to the second shaft 3 and that engages the drive gear 31, and the fourth speed gear 40 has a drive gear 41 that is relatively rotatably fixed to the first shaft 2, and a driven gear 42 that is relatively unrotatably fixed to the second shaft 3 and that engages the drive gear 41. The fifth speed gear 50 has a drive gear 51 that is relatively rotatably fixed to the first shaft 2, and a driven gear 52 that is relatively unrotatably fixed to the second shaft 3 and that engages the drive gear 51, and the sixth speed gear 60 has a drive gear 61 that is relatively rotatably fixed to the first shaft 2, and a driven gear 62 that is relatively unrotatably fixed to the second shaft 3 and that engages the drive gear 61.

Hubs 70 are members that are respectively relatively unrotatably fixed to the second shaft 3 between the driven gears 12 and 32, the first shaft 2 between the drive gears 21 and 51, and the first shaft 2 between the drive gears 41 and 61. The driven gears 12 and 32 and the drive gears 21, 41, 51, and 61 are provided with teeth (dog teeth) 106 and 107 (see FIG. 5) respectively protruding in the axial direction on their end surfaces in the axial direction. Clutch rings 90 are members that are mounted on the hubs 70 so as to be relatively movable in the axial direction, that engage the hubs 70, and that are provided with teeth protruding in the axial direction on their end surfaces in the axial direction (dog teeth, first teeth 95 and second teeth 100, see FIG. 5). The clutch rings 90 move in the axial direction so that the first teeth 95, the second teeth 100, and the teeth 106 and 107 selectively engage each other, so that the first speed gear 10, the second speed gear 20, the third speed gear 30, the fourth speed gear 40, the fifth speed gear 50, and the sixth speed gear 60 are selectively coupled to the first shaft 2 to perform gear shift.

An operating portion 110 is a device for selectively moving the clutch rings 90 in the axial direction, and has shift forks 111, 112, and 113 that respectively engage the clutch rings 90, uneven members 114 that are respectively coupled to the shift forks 111, 112, and 113, and shift arms 120, 121, and 122 that are respectively coupled to the uneven members 114. The uneven members 114 are members that provide a biasing force in the axial direction to the clutch rings 90 through the shift forks 111, 112, and 113. Each uneven member 114 has recesses 115, 116, and 117 recessed in a semispherical shape, which are aligned in the axial direction (the right-left direction in FIG. 1). The recesses 115, 116, and 117 are portions that a ball 118 biased toward the uneven member 114 by a spring (a coil spring) 119 fixed to case C resiliently engages. The shift arm 120 has an end that engages a shift groove 124 formed on the outer circumference of a shift drum 123 in a cylindrical shape fixed to case C, the shift arm 121 has an end that engages a shift groove 125 formed on the outer circumference of the shift drum 123 in a cylindrical shape fixed to case C, and the shift arm 122 has an end that engages a shift groove 126 formed on the outer circumference of the shift drum 123 in a cylindrical shape fixed to case C.

The shift drum 123 is rotationally driven at its axis by a motor (not illustrated) based on the operation signal of a shift lever (not illustrated), or based on the accelerator opening and the vehicle speed signal by the operation of an accelerator pedal (not illustrated). When the shift drum 123 is rotationally driven, the shift forks 111, 112, and 113 are selectively driven in the axial direction through the shift arms 120, 121, and 122, respectively, that are guided by the shift grooves 124, 125, and 126, respectively. By driving of each of the shift forks 111, 112, and 113, each clutch ring 90 moves in the axial direction.

In the uneven member 114, the positions of the recesses 116 and 117 correspond to an engaging position (a first position) where one of the driven gears 12 and 32 and the drive gears 21, 41, 51, and 61 and the clutch ring 90 interlock, and the position of the recess 115 corresponds to a neutral position (a second position) where one of the driven gears 12 and 32 and the drive gears 21, 41, 51, and 61 and the clutch ring 90 separate from each other. The ball 118 resiliently engages one of the recesses 115, 116, and 117, and the clutch ring 93 is then positioned to the first position (the engaging position) or the second position (the neutral position) in the axial direction.

Figure 2B:
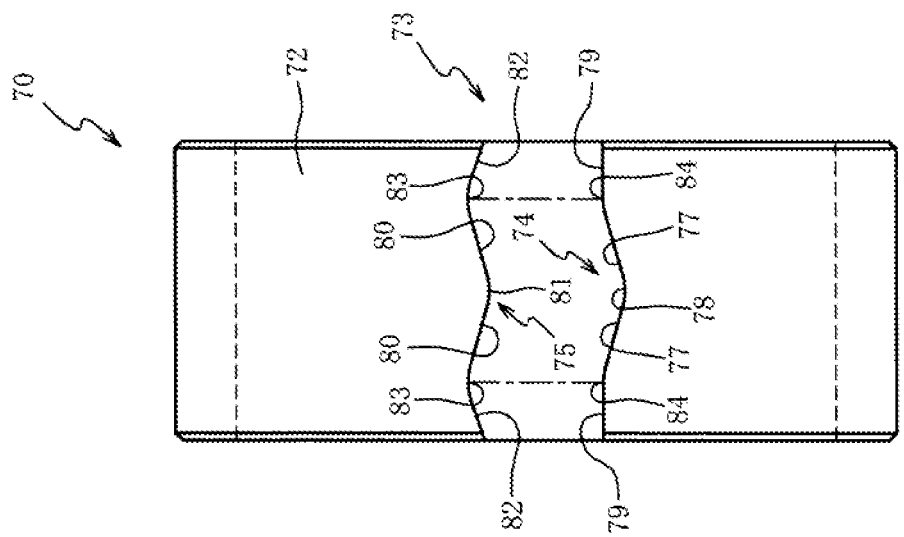
FIG. 2(b) is a front view of the hub.
Figure 2A:
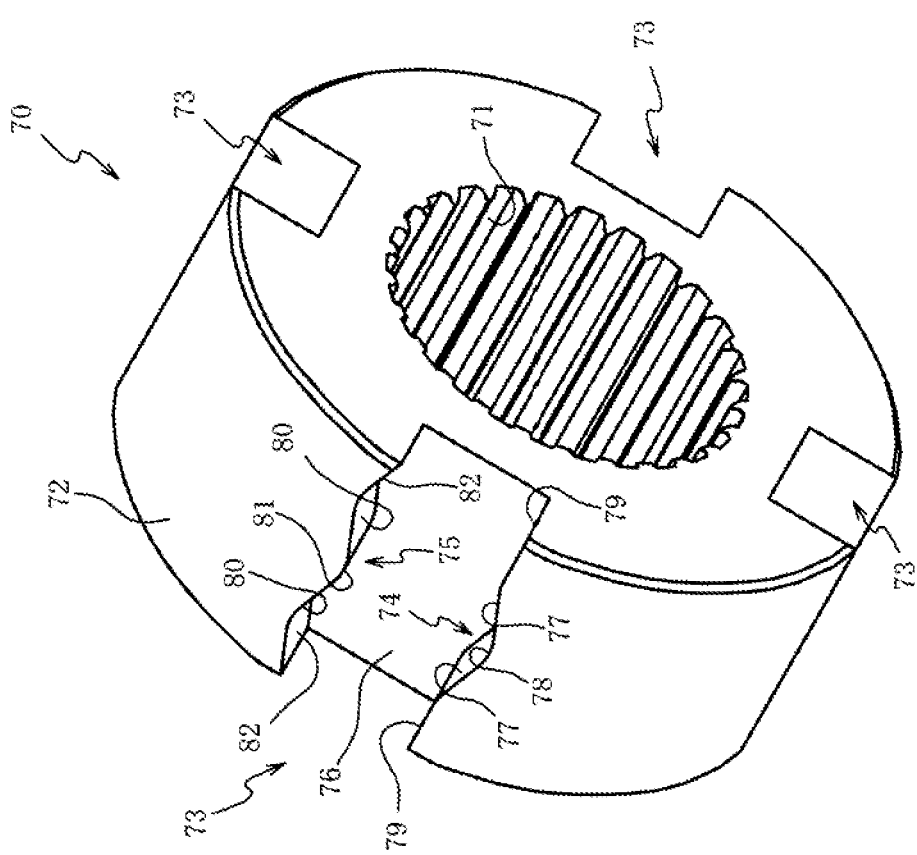
FIG. 2(a) is a perspective view of a hub.

The hub 70 will be described with reference to FIGS. 2(a) and 2(b). FIG. 2(a) is a perspective view of the hub 70, and FIG. 2(b) is a front view of the hub 70. As illustrated in FIG. 2(a), the hub 70 is a cylindrical member in which splines that are coupled to the first shaft 2 or the second shaft 3 (see FIG. 1) are formed in an inner circumferential surface 71, and four groove portions 73 are formed at equal intervals in the circumferential direction of an outer circumferential surface 72. Bach groove portion 73 is a portion that is formed along the axial direction and that is recessed in the radial direction, and has a first wall 74 and a second wall 75 that are opposite to each other so as to be spaced in the circumferential direction, and a bottom 76 that is joined to the first wall 74 and the second wall 75.

As illustrated in FIG. 2(b), the first wall 74 has first portions 77 that lower and incline in the circumferential direction (the direction away from the second wall 75) from the outside in the axial direction toward a center portion 78, and third portions 79 that are joined to the outside in the axial direction of the first portions 77. Each first portion 77 is an inclining surface that inclines with respect to the axial direction, and each third portion 79 is a flat surface in parallel with the axial direction. The second wall 75 has second portions 80 that rise and incline in the circumferential direction (the direction closer to the first wall 74) from the outside in the axial direction toward a center portion 81, and guides 82 that are joined to the outside in the axial direction of the second portions 80 and that lower and incline in the circumferential direction (the direction away from the first wall 74) from the outside in the axial direction toward the second portions 80.

Each second portion 80 and each guide 82 are inclining surfaces in which the inclining directions with respect to the axial direction are different from each other. The guide 82 is opposite to the third portion 79 in the circumferential direction (the rotational direction), and the second portion 80 is opposite to the first portion 77 in the circumferential direction (the rotational direction). The position in the axial direction (the right-left direction in FIG. 2(b)) of a boundary 83 between the second portion 80 and the guide 82 is set to be the same as the position in the axial direction of a boundary 34 between the first portion 77 and the third portion 79.

Figure 3C:
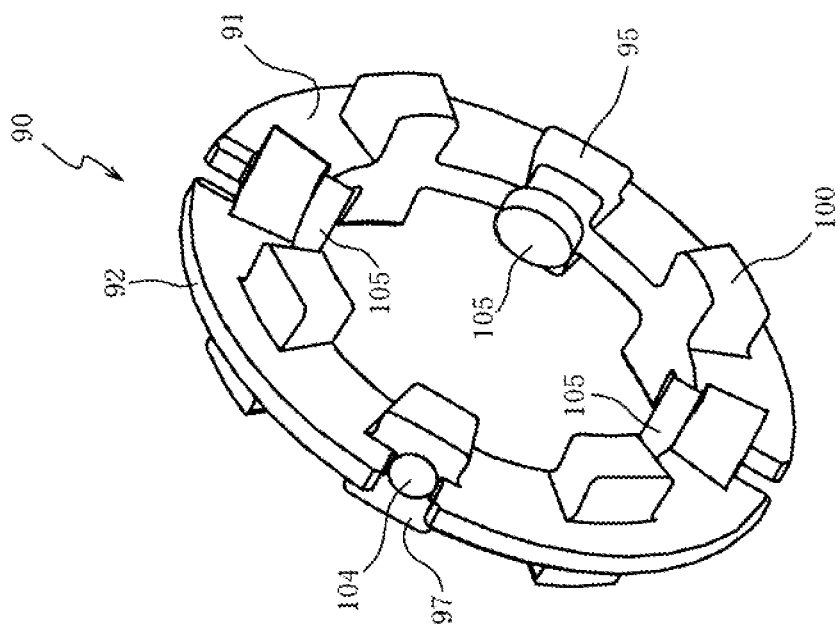
FIG. 3(c) is a perspective view of the clutch ring on which the pin is mounted.
Figure 3B:
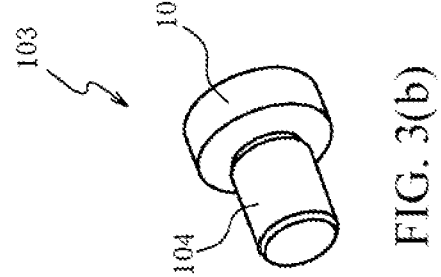
FIG. 3(b) is a perspective view of a pin constituting a protrusion.
Figure 3A:
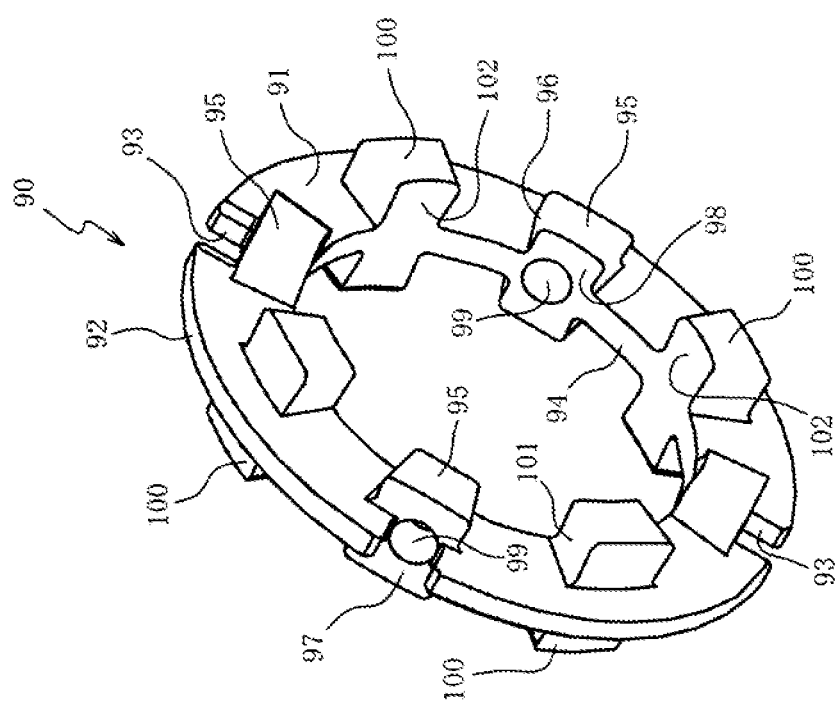
FIG. 3(a) is a perspective view of a clutch ring.
Figure 4B:
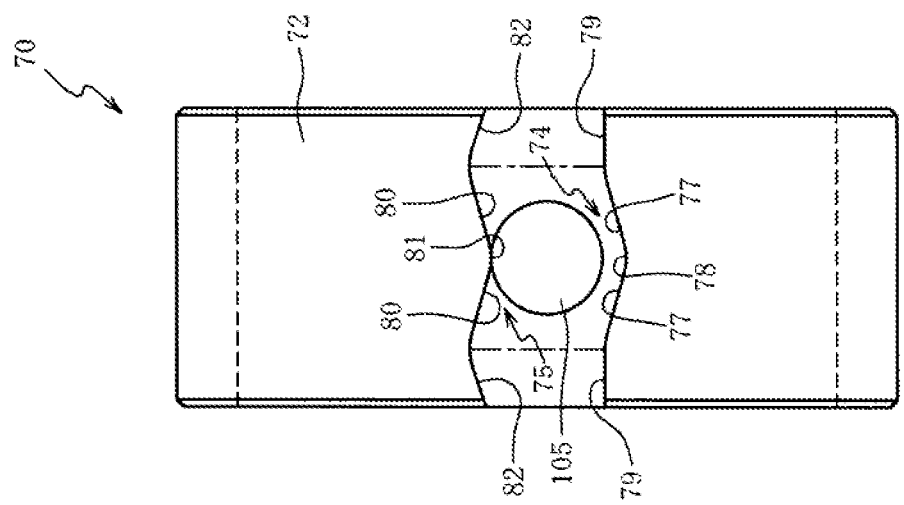
FIG. 4(b) is a front view of a groove portion and the protrusion.
Figure 4A:
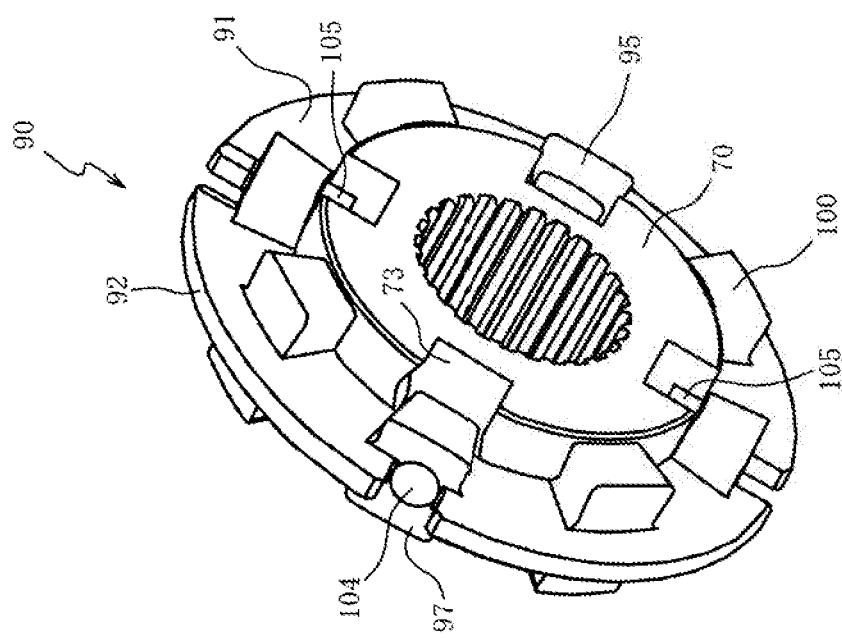
FIG. 4(a) is a perspective view of the hub on which the clutch ring is mounted.

The clutch ring 90 that is mounted on the outer circumferential surface 72 of the hub 70 (see FIG. 2(a)) will be described with reference to FIGS. 3(a) to 4(b). FIG. 3(a) is a perspective view of the clutch ring 90, FIG. 3(b) is a perspective view of a pin 103 constituting a protrusion 105, and FIG. 3(c) is a perspective view of the clutch ring 90 on which the pin 103 is mounted. FIG. 4(a) is a perspective view of the hub 70 on which the clutch ring 90 is mounted, and FIG. 4(b) is a front view of the groove portion 73 and the protrusion 105.

As illustrated in FIG. 3(a), the clutch ring 90 has a ring main body 91 in an annular shape, and a plurality of first teeth 95 and second teeth 100 (dog teeth) that protrude from the end surfaces in the axial direction of the ring main body 91 toward both sides in the axial direction. In the ring main body 91, four cutaway portions 93 that are cut away from an outer circumferential surface 92 toward the inside in the radial direction are disposed at equal intervals in the circumferential direction. The inner diameter of an inner circumferential surface 94 of the ring main body 91 is formed to be slightly larger than the outer diameter of the outer circumferential surface 72 of the hub 70 (see FIG. 2(a)).

Each first tooth 95 is disposed between the inner circumferential surface 94 in a circular shape and the bottom of the cutaway portion 93 of the ring main body 91, and has an end surface 96 in the circumferential direction that is an inclining surface that inclines from the tooth end toward the tooth base (the inside in the axial direction) so that the tooth thickness (the thickness in the circumferential direction) of the tooth base is smaller than the tooth thickness of the tooth end (the end in the axial direction). The ring main body 91 is formed with a hole 99 that extends in the radial direction through between an end surface 97 on the outside in the radial direction of the first tooth 95 and an end surface 98 on the inside in the radial direction and the inner circumferential surface 94. The inner circumferential surface 94 of the ring main body 91 and the end surface 97 of the first tooth 95 are disposed on the same plane.

Four second teeth 100 are disposed between four first teeth 95 disposed in the circumferential direction of the ring main body 91 so as to be alternately disposed with the first teeth 95. Each second tooth 100 is an inclining surface in which an end surface 101 in the circumferential direction inclines from the tooth end toward the tooth base (the inside in the axial direction) so that the tooth thickness (the thickness in the circumferential direction) of the tooth base is smaller than the tooth thickness of the tooth end (the end in the axial direction). The length from the tooth base to the tooth end (the length that protrudes in the axial direction) of the second tooth 100 is set to be more than that of the first tooth 95. The inner circumferential surface 94 of the ring main body 91 and an end surface 102 on the inside in the radial direction of the second tooth 100 are disposed on the same plane.

As illustrated in FIG. 3(b), the pin 103 has a shaft 104 that is fitted in the hole 99 formed in the ring main body 91, and the protrusion 105 that protrudes from the end of the shaft 104 to the outside in the radial direction of the shaft 104. The shaft 104 is formed in a cylindrical shape whose length is set to be substantially the same as the length of the hole 99. The protrusion 105 is formed in a cylindrical shape in which the length (thickness) in the axial direction is less than the height of the first wall 74 and the second wall 75 of the hub 70 (see FIG. 2(a)), and in which the size in the radial direction is set to be less than the interval between the first wall 74 and the second wall 75.

As illustrated in FIG. 3(c), in the clutch ring 90, the shaft 104 of the pin 103 is inserted from the inner circumferential surface 94 side of the ring main body 91 into the hole 99, so that the protrusion 105 is fixed to the end surface 98 of the first tooth 95. The protrusion 105 is disposed on the inside in the radial direction of the ring main body 91, so that the protrusion 105 also serves to prevent coming off of the pin 103. The pin 103 is fitted in the hole 99 of the ring main body 91 to manufacture the clutch ring 90, so that as compared with the case where the protrusion 105 is disposed integrally with the ring main body 91, the processing of the clutch ring 90 can be simplified. Since the clutch ring 90 is formed with the hole 99 at the position of the first tooth 95, the hole diameter can be made larger than the case where the hole 99 is formed at the position other than the first tooth 95 and the second tooth 100, and the shaft 104 can be thick. Since the strength of the shaft 104 that is fitted in the hole 99 can be enhanced, the durability of the clutch ring 90 can be improved.

As illustrated in FIG. 4(a), the clutch ring 90 is mounted on the outer circumferential surface 72 of the hub 70 by inserting the protrusions 105 from the axial direction into the groove portions 73 of the hub 70. As illustrated in FIG. 4(b), the protrusion 105 is disposed between the first wall 74 and the second wall 75. The first wall 74 and the second wall 75 abut on the protrusion 105, so that the hub 70 and the clutch ring 90 rotate integrally.

In a state where the clutch ring 90 is mounted on the hub 70, the inner circumferential surface 94 of the clutch ring 90 and the end surfaces 102 of the second teeth 100 come into contact with the outer circumferential surface 72 of the hub 70. When the clutch ring 90 moves in the axial direction with respect to the hub 70, the end surfaces 102 of the second teeth 100 rub on the outer circumferential surface 72 of the hub 70, so that the ring main body 91 is supported with respect to the hub 70. When the clutch ring 90 tilts with respect to the hub 70, there is a fear that gear shift cannot be performed smoothly, but since falling of the clutch ring 90 with respect to the hub 70 is prevented by the second teeth 100, smooth gear shift can be secured.

When a member that supports the clutch ring 90 is additionally disposed to prevent tilting of the clutch ring 90 with respect to the hub 70, the supporting configuration of the clutch ring 90 is complicated. However, since the clutch ring 90 is supported by using the second teeth 100, additional disposition of the member that supports the clutch ring 90 can be omitted. Thus, the supporting configuration of the clutch ring 90 can be simplified.

The clutch ring 90 uses the teeth (the second teeth 100) as the supporting portions that prevent tilting with respect to the hub 70, so that as compared with the case where the supporting portions are disposed separately from the teeth, the processing of the clutch ring 90 can be simplified. Since the second teeth 100 have a length protruding in the axial direction more than that of the first teeth 95, the supporting length of the ring main body 91 with respect to the hub 70 can be increased, as compared with the case where the first teeth 95 whose length protruding in the axial direction is short are used as the supporting portions. By using the second teeth 100, the stability when the clutch ring 90 is moved in the axial direction with respect to the hub 70 can be improved as compared with the case where the first teeth 95 are used.

The number of the first teeth 95 is the same as the number of the second teeth 100, and the protrusions 105 protrude from the positions of the first teeth 95 in the radial direction of the ring main body 91. Both of the function of integrally rotating the hub 70 and the clutch ring 90 by the protrusions 105 and the tilting prevention function by the second teeth 100 can be achieved, so that the reliability of the transmission 1 can be secured.

Figure 5:
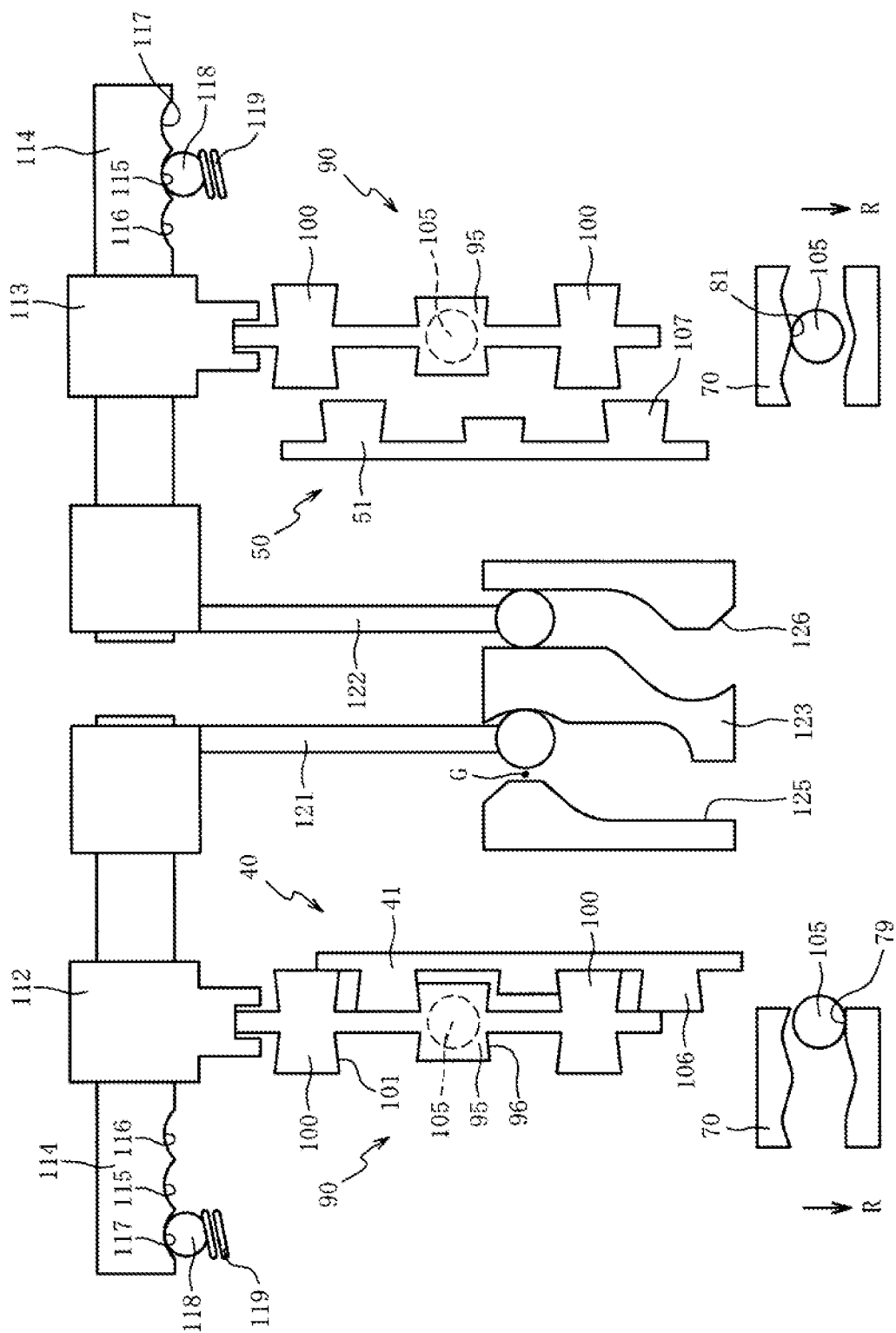
FIG. 5 is a schematic diagram of the transmission during coasting at a low gear.
Figure 6:
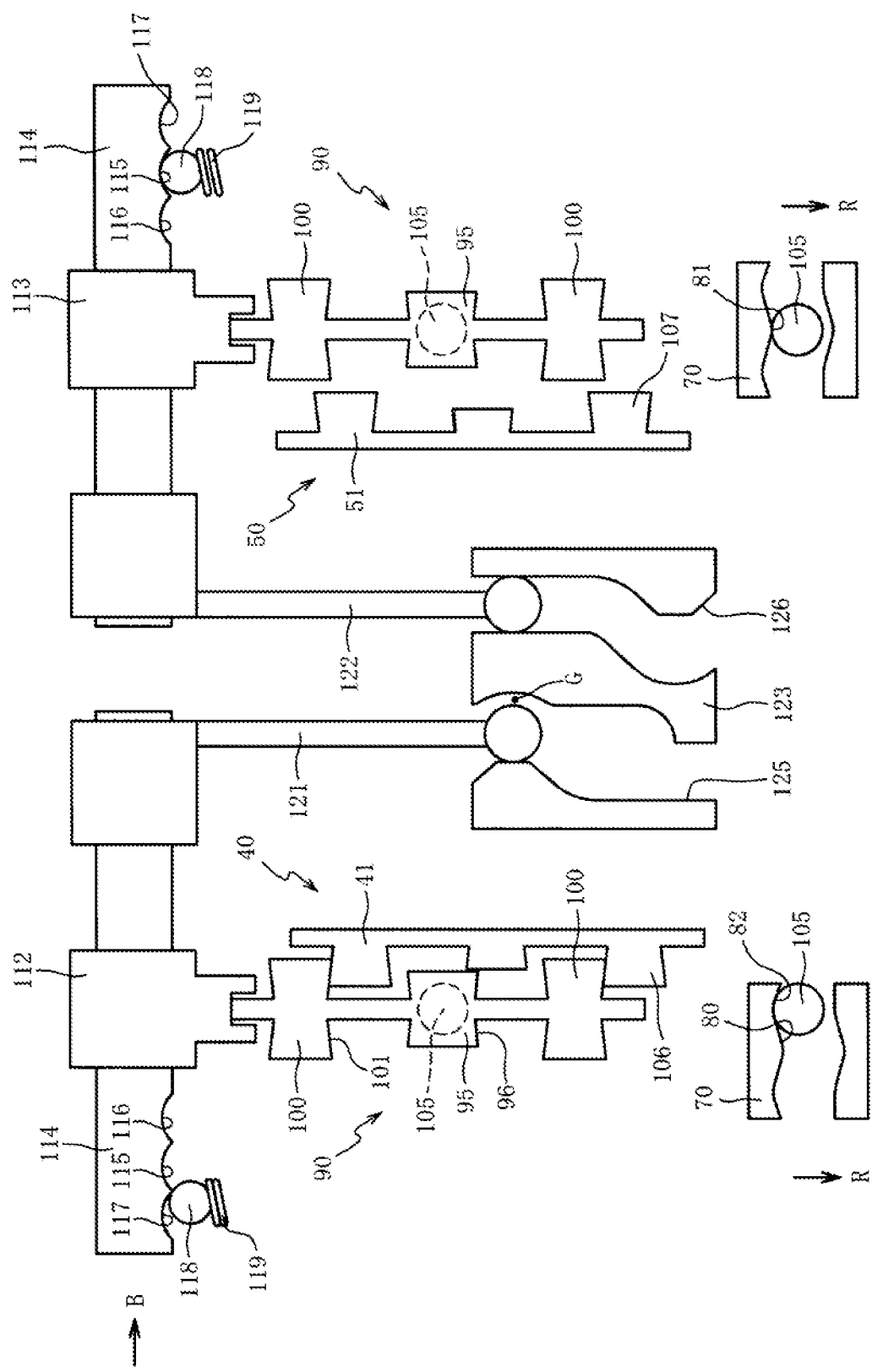
FIG. 6 is a schematic diagram of the transmission during drive traveling at the Low gear.

The operation of the transmission 1 during gear shift to a high gear (shift up) will be described with reference to FIGS. 5 to 9. In this embodiment, gear shift from the fourth speed gear 40 to the fifth speed gear 50 will be described as an example, and since the operation of gear shift to other gears is similar, the description of gear shift to other gears is omitted. First, the operation of the transmission 1 at a low gear (the fourth speed gear 40) will be described with reference to FIGS. 5 and 6. FIG. 5 is a schematic diagram of the transmission 1 during coasting at the low gear (the fourth speed gear 40), and FIG. 6 is a schematic diagram of the transmission 1 daring drive traveling at the low gear (the fourth speed gear 40). From FIGS. 5 to 9, the rotational direction of the drive gears 41 and 51, the hub 70, and the clutch ring 90 is the downward direction (the direction of arrow R) alongside the sheet surfaces.

As illustrated in FIG. 5, during traveling at the fourth speed gear, the shift fork 112 is moved close to the drive gear 41 of the fourth speed gear 40 by the shift groove 125 of the shift drum 123 and the shift arm 121, and the first teeth 95 and the second teeth 100 of the clutch ring 90 engage the teeth 106 of the drive gear 41. The ball 118 engages the recess 117 of the uneven member 114 (the first position). In contrast, at the fifth speed gear 50, the neutral position (the second position) where the ball 118 engages the recess 115 of the uneven member 114 is maintained, and the clutch ring 90 and the drive gear 51 separate from each other.

During coasting in which power is transmitted from the driven gear 42 of the fourth speed gear 40 (see FIG. 1) to the drive gear 41, since the clutch ring 90 rotates faster than the hub 70, the protrusion 105 abuts on the third portion 79 of the hub 70. Since the third portion 79 is a flat surface along the axial direction, a thrust component force in the axial direction is not generated in the protrusion 105 (the clutch ring 90). Thus, engagement of the clutch ring 90 and the drive gear 41 is held. In the end surfaces 96 in the circumferential direction of the first teeth 95, the end surfaces 101 in the circumferential direction of the second teeth 100, and the teeth 106 of the drive gear 41, the inclining surfaces that incline from the tooth ends toward the tooth bases rub against each other, so that the rubbing prevents gear disengagement.

As illustrated in FIG. 6, during drive traveling in which power is transmitted from the drive gear 41 to the driven gear 42 (see FIG. 1), since the hub 70 rotates faster than the clutch ring 90, the protrusion 105 abuts on the guide 82 of the hub 70. Since the guide 82 inclines with respect to the axial direction and lowers and inclines in the circumferential direction toward the second portion 80, a force in the axial direction toward the second portion 80 acts on the protrusion 105 (the clutch ring 90). Since play (gap) G in the axial direction is between the shift groove 125 and the shift arm 121 (see FIG. 5), the clutch ring 90 moves by that amount in the direction separating from the drive gear 41. The protrusion 105 of the clutch ring 90 is brought into a state of abutting on the guide 82 and the second portion 80. In contrast, at the fifth speed gear 50, since the hub 70 rotates faster than the clutch ring 90, the protrusion 105 abuts on the center portion 81 of the second wall 75 of the hub 70.

At the fourth speed gear 40, the uneven member 114 that has moved in the axial direction with movement of the clutch ring 90 pushes away the ball 118 by means of the recess 117, and compresses the spring 119 to store resilient energy. Thus, the spring 119 provides a biasing force in the axial direction (the direction of arrow B) that deepens engagement with the drive gear 41, to the clutch ring 90. In addition, in the end surfaces 96 in the circumferential surface of the first teeth 95, the end surfaces 101 in the circumferential direction of the second teeth 100, and the teeth 106 of the drive gear 41, the inclining surfaces that incline from the tooth ends toward the tooth bases rub against each other, so that the rubbing prevents gear disengagement.

During coasting in which power is transmitted from the driven gear 42 (see FIG. 1) to the drive gear 41 (see FIG. 5), power is not transmitted from the first shaft 2 (see FIG. 1) to the drive gear 41, so that the clutch ring 90 moves in the direction that deepens engagement with the drive gear 41 with restoring of the spring 119 by a biasing force in the axial direction (the direction of arrow B) by the spring 119. Since the clutch ring 90 rotates faster than the hub 70, the protrusion 105 abuts on the third portion 79 of the hub 70. During traveling at the fourth speed gear 40, the protrusion 105 moves back and forth between the position where the protrusion 105 abuts on the guide 82 and the second portion 80 and the position where the protrusion 105 abuts on the third portion 79 by switching between drive traveling and coasting.

Figure 7:
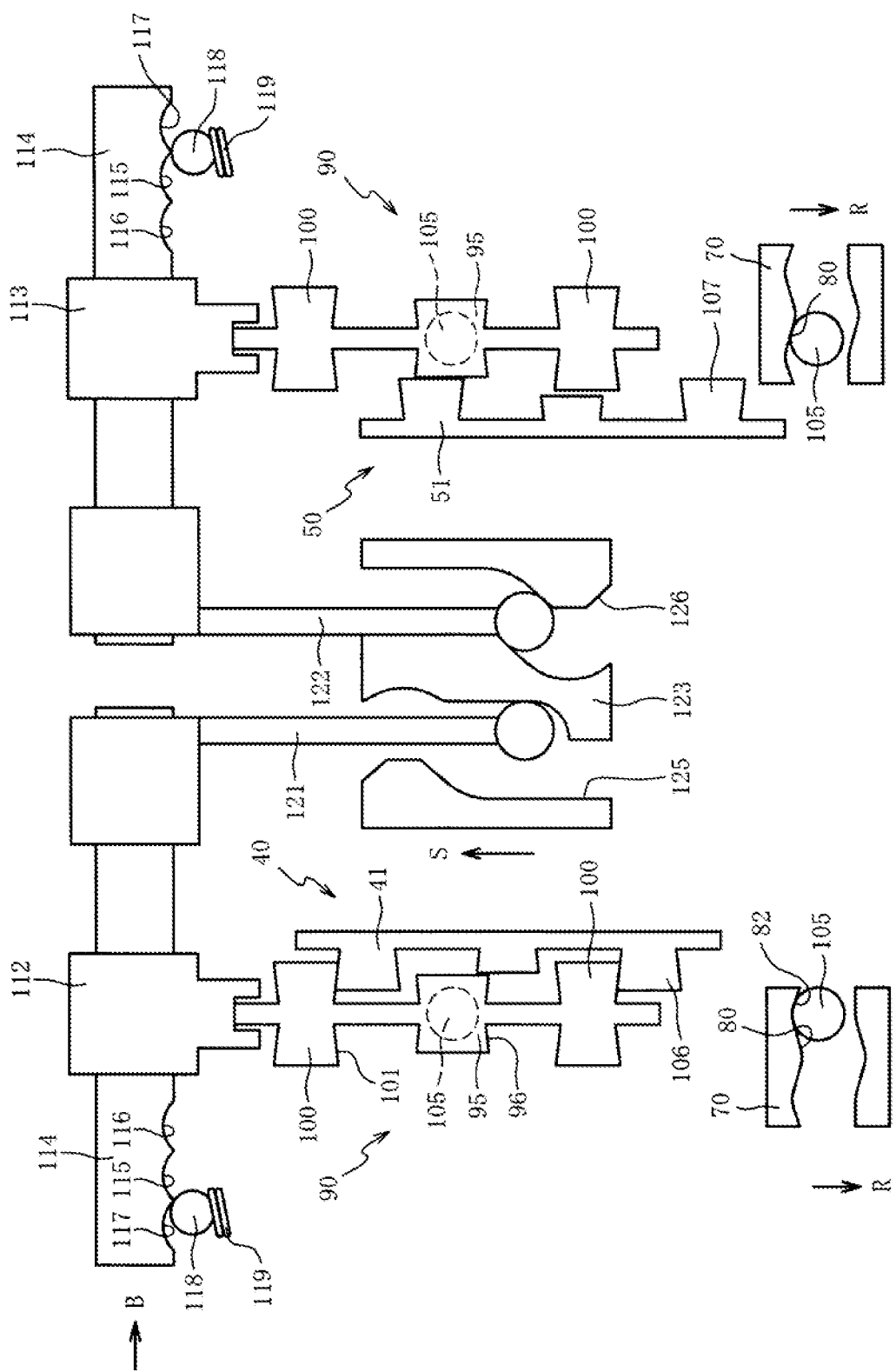
FIG. 7 is a schematic diagram of the transmission during gear shift from the low gear to a high gear.
Figure 8:
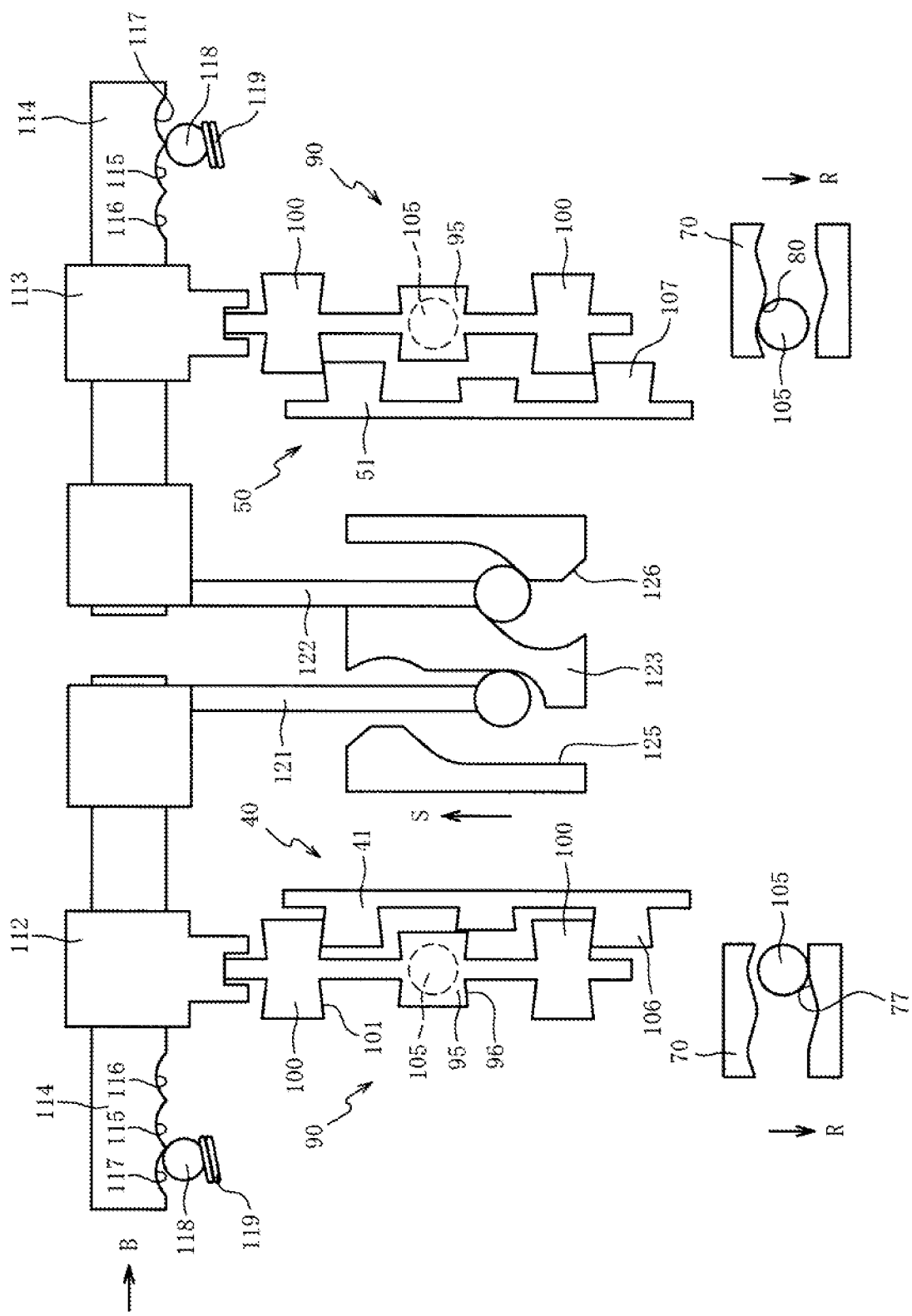
FIG. 8 is a schematic diagram of the transmission immediately after gear shift from the low gear to the high gear.
Figure 9:
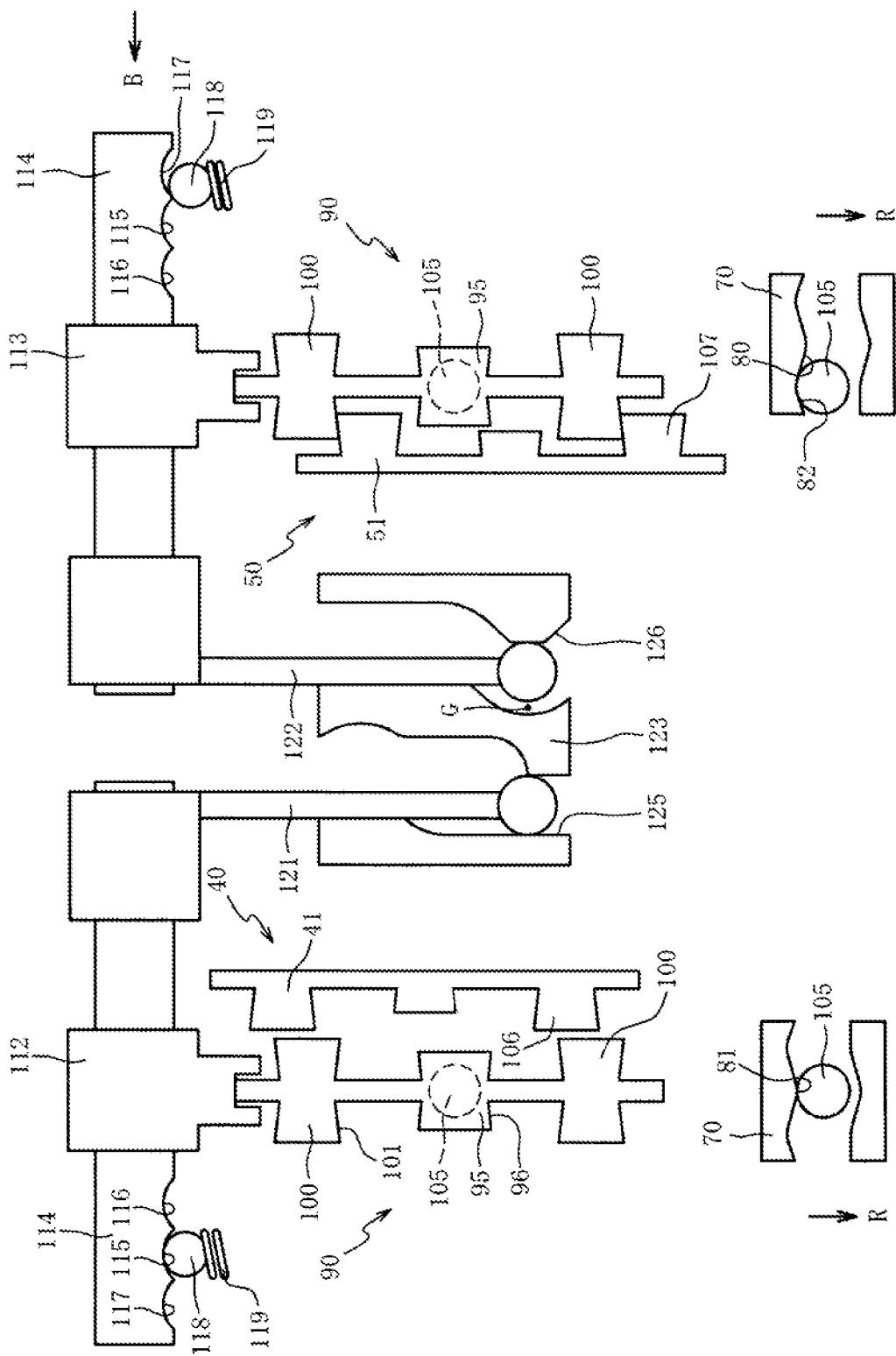
FIG. 9 is a schematic diagram of the transmission during drive traveling at the high gear.

FIG. 7 is a schematic diagram of the transmission 1 during gear shift from the low gear (the fourth speed gear 40) to the high gear (the fifth speed gear 50), FIG. 8 is a schematic diagram of the transmission 1 immediately after gear shift from the low gear to the high gear, and FIG. 9 is a schematic diagram of the transmission 1 during drive traveling at the high gear (the fifth speed gear 50). Arrow S illustrated in FIGS. 7 and 8 is the rotational direction during shift up of the shift drum 123.

As illustrated in FIG. 7, during drive traveling in which power is transmitted from the drive gear 41 to the driven gear 42 (FIG. 1), when the shift drum 123 is rotated to perform the shift up operation to the high gear (the fifth speed gear 50), the shift fork 113 moves close to the drive gear 51 of the fifth speed gear 50 by means of the shift groove 126 of the shift drum 123 and the shift arm 122, so that the tooth ends of the first teeth 95 of the clutch ring 90 abut on the tooth ends of the teeth 107 of the drive gear 51. Since the second teeth 100 of the clutch ring 90 have a length in the axial direction more than that of the first teeth 95, the second teeth 100 and the teeth 107 of the drive gear 51 can easily engage each other. In contrast, at the fourth speed gear 40, the spring 119 is compressed through the ball 118 by the recess 117 of the uneven member 114, so that a state where the clutch ring 90 and the drive gear 41 engage each other is maintained.

As illustrated in FIG. 8, when the drive gear 51 of the fifth speed gear 50 and the clutch ring 90 engage each other (the teeth 107 and the second teeth 100 engage each other) in a state where the drive gear 41 of the fourth speed gear 40 and the clutch ring 90 engage each other, since the fifth speed gear 50 rotates faster than the fourth speed gear 40, the fourth speed gear side is brought into the coasting state by internal circulation torque, and the fifth speed gear side is brought into the drive state by internal circulation torque. At the fifth speed gear 50, the protrusion 105 abuts on the second portion 80 of the hub 70, so that a force in the axial direction in which the clutch ring 90 deeply engages the drive gear 51 acts on the protrusion 105. At the fourth speed gear 40, relative rotation of the hub 70 and the clutch ring 90 moves the protrusion 105 that abuts on the second portion 80 and the guide 82, to the first wall 74 side, so that the protrusion 105 abuts on the first portion 77 of the hub 70. In the first portion 77, a force in the axial direction that moves the clutch ring 90 in the neutral direction (to the center portion 78 side of the hub 70) to release engagement with the drive gear 41 acts on the protrusion 105. This thrust force moves the clutch ring 90 in the neutral direction.

As illustrated in FIG. 9, gear shift to the fifth speed gear 50 is completed by the shift drum 123, and at the fourth speed gear 40, the neutral position (the second position) where the ball 118 engages the recess 115 of the uneven member 114 is maintained, and a state where the clutch ring 90 and the drive gear 41 separate from each other is maintained. At the fifth speed gear 50, the ball 118 engages the recess 117 of the uneven member 114.

During drive traveling in which power is transmitted from the drive gear 51 to the driven gear 52 (see FIG. 1), the protrusion 105 abuts on the guide 82 of the hub 70. Since the guide 82 inclines with respect to the axial direction and lowers and inclines in the circumferential direction toward the second portion 80, a force in the axial direction toward the second portion 80 acts on the protrusion 105 (the clutch ring 90). Since play (gap) G in the axial direction is between the shift groove 125 and the shift arm 121, the clutch ring 90 moves by that amount in the direction separating from the drive gear 51. The protrusion 105 of the clutch ring 90 is brought into a state of abutting on the guide 82 and the second portion 80. The uneven member 114 pushes away the ball 118 by means of the recess 117, and compresses the spring 119 to store resilient energy. Thus, the spring 119 provides a biasing force in the axial direction (the direction of arrow B) that deepens engagement with the drive gear 51, to the clutch ring 90.

As described above, in the transmission 1, when a force in the axial direction from the engaging position (the first position) of the clutch ring 90 to the neutral position (the second position) is generated in the protrusion 105 by the guide 82 disposed in the hub 70 (during drive traveling in which power is transmitted from the drive gear 41 to the driven gear 42), the clutch ring 90 separates in the axial direction from the transmission gear, such as the fourth speed gear 40, by the length in the axial direction of the guide 82. Thus, gear shift from the low gear to the high gear can be brought into the standby state, so that any shock during gear shift can be prevented.

When two clutch rings 90 simultaneously interlock with two transmission gears (the fourth speed gear 40 and the fifth speed gear 50) having different gear ratios during gear shift from the low gear to the high gear, a force in the axial direction from the first position toward the second position is generated in the protrusion 105 by the first portion 77 that inclines with respect to the axial direction, so that the clutch ring 90 that interlocks with the low-speed transmission gear (the fourth speed gear 40) having the number of rotations lower than the high-speed transmission gear (the fifth speed gear 50) is pushed out in the axial direction by internal circulation torque. When the high-speed transmission gear (the fifth speed gear 50) and the clutch ring 90 interlock, the low-speed transmission gear (the fourth speed gear 40) and the clutch ring 90 separate from each other to establish the high gear, so that torque loss during gear shift can be eliminated.

Since the guide 82 can be formed together with the processing of the first wall 74 and the second wall 75 to dispose the groove portion 73 in the hub 70, an increase in the component processing workload due to disposition of the guide portion 82 can be prevented, and the processing for disposing slant surfaces with respect to the tooth bases of the clutch ring 90 can be unnecessary. Thus, the processing of components can be simplified while torque loss during gear shift can be eliminated.

In the transmission 1, the protrusion 105 abuts on the second portion 80 of the second wall 75 during drive traveling in which power is transmitted from the drive gear 41 to the driven gear 42. The second portion 80 is opposite to the first portion 77 in the rotational direction (the circumferential direction), and is joined to the guide 82, so that when the protrusion 105 that has moved to the second portion 80 by the guide 82 relatively moves in the rotational direction from the second portion 80 to the first portion 77, power cannot be transmitted from the drive gear 41 to the driven gear 42. In a state where power cannot be transmitted from the drive gear 41 to the driven gear 42, the clutch ring 90 and the fourth speed gear 40 can separate from each other. When the clutch ring 90 and the fourth speed gear 40 are separated from each other, gear shift to the high gear (the fifth speed gear 50) is performed, so that gear shift can be performed smoothly.

In the transmission 1, the protrusion 105 abuts on the guide 82 and the second portion 80 during drive traveling in which power is transmitted from the drive gear 41 to the driven gear 42 or from the drive gear 51 to the driven gear 52. Thus, as compared with the case where the guide 82 and the second portion 80 are spaced in the axial direction so that the protrusion 105 can move between the guide 82 and the second portion 80 during drive traveling, the length in the axial direction of the second wall 75, that is, the length in the axial direction of the hub 70, can be shortened. As a result, the length in the axial direction of the transmission 1 in which a plurality of hubs 70 are disposed can be shortened.

In the transmission 1, the position in the axial direction of the protrusion 105 (the position where the ball 118 engages the recess 117 of the uneven member 114) when the clutch ring 90 is moved closest to the drive gear 41 or 51 (the transmission gear) by the operating portion 110 is set to be the same as the position in the axial direction of the guide 82. During drive traveling in which power is transmitted from the drive gear 41 to the driven gear 42, a biasing force in the axial direction from the neutral position (the second position) toward the engaging position (the first position) of the clutch ring 90 is provided to the clutch ring 90 by the spring 119. The second portion 80 inclines with respect to the axial direction so that a force in the axial direction from the second position toward the first position is generated in the protrusion 105, so that a biasing force in the axial direction by the spring 119 allows a force in the axial direction in which the clutch ring 90 is less like to be separated from the transmission gear (the fourth speed gear 40), to act on the protrusion 105 (the clutch ring 90). Thus, gear disengagement can be prevented.

In the transmission 1, during coasting in which power is transmitted from the driven gear 42 to the drive gear 41, the protrusion 105 abuts on the third portion 79 of the first wall 74. The third portion 79 is joined to the first portion 77, and is opposite to the guide 82 in the rotational direction (the circumferential direction), so that, the protrusion 105 abuts on the guide 82 during drive traveling, and abuts on the third portion 79 during coasting. Thus, switching between drive traveling and coasting is enabled smoothly.

Figure 10:
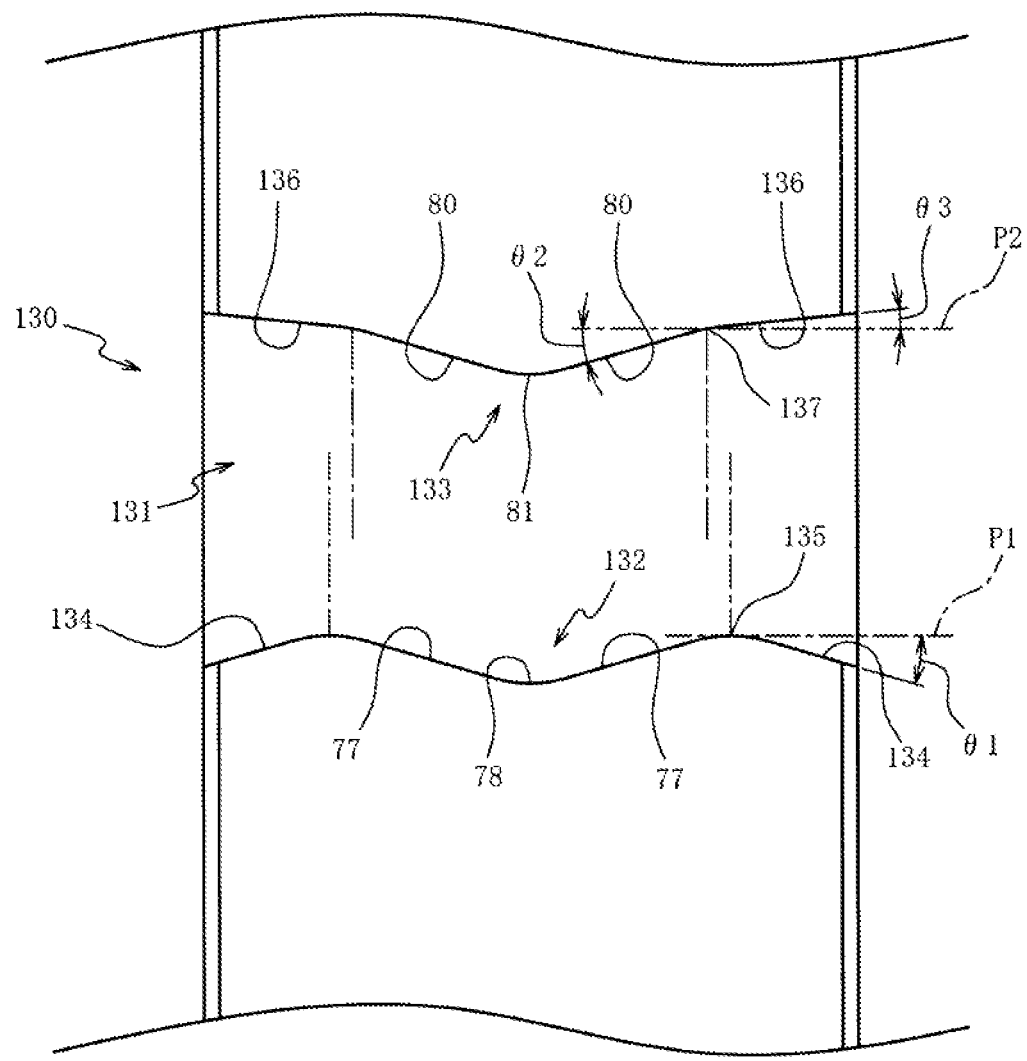
FIG. 10 is a partially enlarged view of the hub used in the transmission according to a second embodiment.

A second embodiment will be described with reference to FIG. 10. In the first embodiment, the case where the inclining surfaces that incline from the tooth ends to the tooth bases are disposed with respect to the end surfaces 96 in the circumferential direction of the first teeth 95, the end surfaces 101 in the circumferential direction of the second teeth 100, the end surfaces in the circumferential direction of the teeth 106 of the drive gear 41, and the end surfaces in the circumferential direction of the teeth 107 of the drive gear 51, so that the rubbing between the inclining surfaces prevents gear disengagement, has been described. On the contrary, in the second embodiment, the case where the portions that prevent gear disengagement are disposed in a groove portion 131 of a hub 130 will be described. It is to be noted that the same portions as the portions that have been described in the first embodiment, are indicated by similar reference signs and that the following description is omitted. FIG. 10 is a partially enlarged view of the hub 130 used in the transmission according to the second embodiment. In FIG. 10, the circumferential direction of the hub 130 is not illustrated. The hub 130 is disposed in place of the hub 70 of the transmission 1 that has been described in the first embodiment.

As illustrated in FIG. 10, the hub 130 is a cylindrical member that is coupled to the first shaft 2 or the second shaft 3 (see FIG. 1), the groove portion 131 along the axial direction being formed on its outer circumference. The groove portion 131 is a portion that is recessed in the radial direction, and has a first wall 132 and a second wall 133 that are opposite to each other so as to be spaced in the circumferential direction. The first wall 132 has first retaining portions 134 (third portions) that are joined to the outside in the axial direction of the first portions 77 that lower and incline in the circumferential direction from the outside in the axial direction toward the center portion 78.

Each first retaining portion 134 is a surface that is orthogonal to the axial direction, and that, in this embodiment, lowers and inclines in the circumferential direction (the direction away from the second wall 133) from a boundary 135 between the first portion 77 and the third portion 134 toward the outside in the axial direction. The first retaining portion 134 is parallel to the axis, and angle $\theta1$ that is formed between plane P1 passing through the boundary 135 between the first portion 77 and the first retaining portion 134 and the first retaining portion 134 is set to $0°<\theta1\leq90°$. $\theta1=90°$ represents that the first retaining portion 134 is formed in a wall shape that is orthogonal to plane P1.

The second wall 133 has second retaining portions 136 that are joined to the outside in the axial direction of the second portions 80 and that lower and incline in the circumferential direction (the direction away from the first wall 132) toward the outside in the axial direction. Each second portion 80 and each second retaining portion 136 are inclining surfaces in which the inclinations with respect to the axial direction are different from each other. Angle $\theta2$ that is formed between plane P2 that is parallel to the axis and that passes through a boundary 137 between the second portion 80 and the second retaining portion 136 and the second portion 80 is set to be larger than angle $\theta3$ that is formed between plane P2 and the second retaining portion 136 ($\theta2>\theta3$). Angle $\theta3$ formed is set to $0°<\theta3<90°$. In addition, the position in the axial direction of the boundary 137 between the second portion 80 and the second retaining portion 136 is set to the inside in the axial direction (toward the center portions 78 and 81) from the position in the axial direction of the boundary 135 between the first portion 77 and the first retaining portion 134.

In the hub 130, during coasting in which power is transmitted from the driven gear 42 (see FIG. 1) to the drive gear 41 (see FIG. 5), the protrusion 105 abuts on the first retaining portion 134 (the outside in the axial direction from the boundary 135). The first retaining portion 134 is formed to be an inclining surface that lowers and inclines with respect to plane P1 (θ1<90°) or to be a vertical surface in a wall shape (θ1=90), so that movement of the protrusion 105 to the first portion 77 over the boundary 135 during coasting (except during gear shift) can be prevented. As a result, gear disengagement whereby the clutch ring 90 moves in the neutral direction to release engagement with the drive gear 41 can be prevented. In particular, when the first retaining portion 134 is the inclining surface that lowers and inclines with respect to plane P1 (θ1<90°), a thrust force to the drive gear 41 side acts on the protrusion 105 by coasting torque, so that the effect of preventing gear disengagement can be enhanced.

Gear disengagement during coasting can be prevented by disposing the first retaining portion 134 in the first wall 132 together with the processing of the groove portion 131, so that the processing for preventing gear disengagement, for example, the processing for disposing slant surfaces with respect to the transmission gear, such as the drive gear 41 and to the teeth (the first teeth 95 and the second teeth 100) of the clutch ring 90 can be unnecessary. Thus, the processing of components (such as the drive gear 41 and the clutch ring 90) can be simplified while gear disengagement during coasting can be prevented.

In the hub 130, during drive traveling in which power is transmitted from the drive gear 41 to the driven gear 42 (see FIG. 1) (see FIG. 6), the protrusion 105 abuts on the second retaining portion 136 (the outside in the axial direction from the boundary 137). The second retaining portion 136 is formed to be the inclining surface that lowers and inclines with respect to plane P2, so that movement of the protrusion 105 to the second portion 80 over the boundary 137 during drive traveling (except during gear shift) can be prevented. As a result, gear disengagement whereby the clutch ring 90 moves in the neutral direction to release engagement with the drive gear 41 can be prevented. Since the second retaining portion 136 is the inclining surface that lowers and inclines with respect to plane P2 (θ3<90°), a thrust force to the drive gear 41 side acts on the protrusion 105 by drive torque, so that the effect of preventing gear disengagement can be enhanced.

Gear disengagement during drive traveling can be prevented by disposing the second retaining portion 136 in the second wall 133 together with the processing of the groove portion 131, so that the processing for preventing gear disengagement, for example, the processing for disposing slant surfaces with respect to the transmission gear, such as the drive gear 41 and to the teeth (the first teeth 95 and the second teeth 100) of the clutch ring 90 can be unnecessary.

Thus, the processing of components (such as the drive gear 41 and the clutch ring 90) can be simplified while gear disengagement during drive traveling can be prevented.

In the hub 130, angle θ2 that is formed between plane P2 and the second portion 80 is set to be larger than angle θ3 that is formed between plane P2 and the second retaining portion 136, so that the protrusion 105 mainly abuts on the vicinity of the boundary 137 between the second portion 80 and the second retaining portion 136 in which the inclinations with respect to the axial direction are different from each other during drive traveling (except during gear shift). In the hub 130, the boundary 137 between the second portion 80 and the second retaining portion 136 is disposed so as to be located toward the center portions 78 and 81 from the boundary between the first portion 77 and the first retaining portion 134. As a result, when the protrusion 105 that abuts on the vicinity of the boundary 137 between the second portion 80 and the second retaining portion 136 moves in the rotational direction (the circumferential direction) during drive traveling, the protrusion 105 abuts on the first portion 77. Thus, during gear shift from the low gear to the high gear, the clutch ring 90 can be easily pushed out in the axial direction by moving the protrusion 105 along the first portion 77 of the low gear. As a result, gear shift can be performed smoothly.

In the transmission in which the hub 130 is disposed, the position in the axial direction of the protrusion 105 when the clutch ring 90 is moved closest to the transmission gear (such as the drive gear 41 or the driven gear 42) by the operating portion 110 (see FIG. 1) is set to be the same as the position in the axial direction of the first retaining portion 134. During drive traveling in which power is transmitted from the drive gear 41 to the driven gear 42 (see FIG. 6), a biasing force in the axial direction (the direction of arrow B) from the neutral position (the second position) toward the engaging position (the first position) is provided to the clutch ring 90 by the spring 119 of the operating portion 110. The second portion 133 inclines with respect to the axial direction so that a force in the axial direction from the second position toward the first position is generated in the protrusion 105, so that a biasing force in the axial direction by the spring 119 allows a force in the axial direction in which the clutch ring 90 is less likely to be separated from the transmission gear (the fourth speed gear 40), to act on the protrusion 105 (the clutch ring 90). Thus, gear disengagement can be less likely to be caused.

Figure 11:
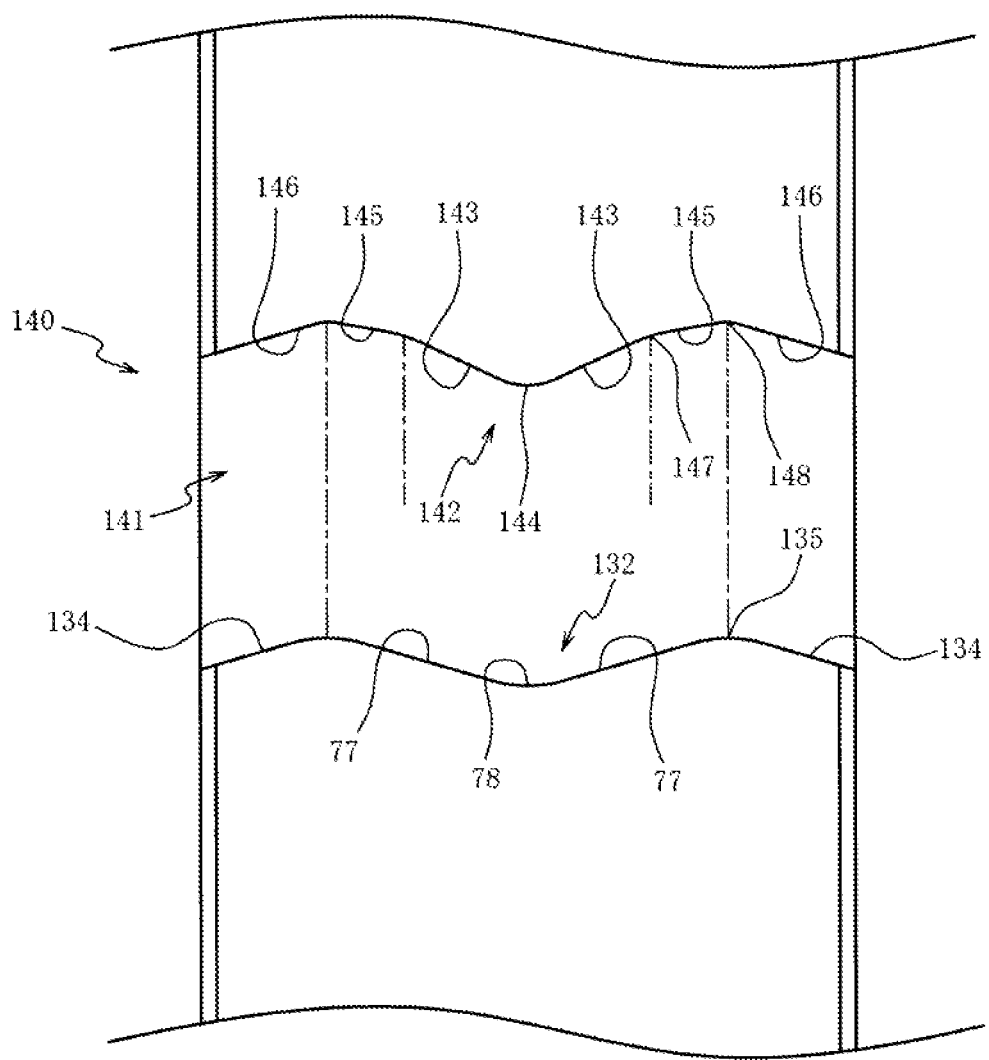
FIG. 11 is a partially enlarged view of the hub used in the transmission according to a third embodiment.

A third embodiment will be described with reference to FIG. 11. In the second embodiment, the case where the second portions 80 and the second retaining portions 136 are disposed in the second wall 133 of the hub 130 has been described. On the contrary, in the third embodiment, the case where in addition to second portions 143 and second retaining portions 145, guides 146 are disposed in a second wall 142 will be described. It is to be noted that the same portions as the portions that have been described in the first embodiment and the second embodiment are indicated by similar reference signs and that the following description is omitted. FIG. 11 is a partially enlarged view of a hub 140 used in the transmission according to the third embodiment. In FIG. 11, the circumferential direction of the hub 140 is not illustrated. The hub 140 is disposed in place of the hub 70 of the transmission 1 that has been described in the first embodiment.

As illustrated in FIG. 11, the hub 140 is a cylindrical member that is coupled to the first shaft 2 or the second shaft 3 (see FIG. 1), a groove portion 141 along the axial direction being formed on its outer circumference. The groove portion 141 is a portion that is recessed in the radial direction, and has the first wall 132 and the second wall 142 that are opposite to each other so as to be spaced in the circumferential direction.

The second wall 142 has the second portions 143 that rise and incline in the circumferential direction (the direction closer to the first wall 132) from the outside in the axial direction toward a center portion 144, the second retaining portions 145 that are joined to the outside in the axial direction of the second portions 143 and that lower and incline in the circumferential direction (the direction away from the first wall 132) from the inside in the axial direction toward the outside in the axial direction, and the guides 146 that are joined to the outside in the axial direction of the second retaining portions 145 and that rise and incline in the circumferential direction toward the outside in the axial direction.

Each second portion 143 and each second retaining portion 145 are inclining surfaces in which the inclinations with respect to tie axial direction are different from each other. An angle that is formed between a plane that is parallel to the axis and that passes through a boundary 147 between the second portion 143 and the second retaining portion 145 (not illustrated) and the second portion 143 is set to be larger than an angle that is formed between the plane and the second retaining portion 145. The angle that is formed between the plane and the second retaining portion 145 is set to 0° to 90°. In addition, the position in the axial direction of the boundary 147 between the second portion 143 and the second retaining portion 145 is set to the inside in the axial direction (toward the center portions 78 and 144) from the position in the axial direction of the boundary 135 between the first portion 77 and the first retaining portion 134. The position in the axial direction of a boundary 143 between the second retaining portion 145 and the guide 146 is set to be the same as the position in the axial direction of the boundary 135 between the first portion 77 and the first retaining portion 134.

In the hub 140, during coasting in which power is transmitted from the driven gear 42 (see FIG. 1) to the drive gear 41 (see FIG. 5), the protrusion 105 abuts on the first retaining portion 134, and during drive traveling in which power is transmitted from the drive gear 41 to the driven gear 42 (see FIG. 1) (see FIG. 6), the protrusion 105 abuts on the guide 146 that is opposite to the first retaining portion 134. The guide 146 is an inclining surface that lowers and inclines toward the second retaining portion 145, so that a thrust force that acts on the protrusion 105 moves the protrusion 105 to the second retaining portion 145 over the boundary 148. Thus, gear shift from the low gear to the high gear can be brought into the standby state, so that any shock during gear shift can be prevented.

The direction inclining with respect to the axial direction of the second retaining portion 145 is different from that of the guide 146, so that movement of the protrusion 105 toward the center portion 144 during drive traveling (except during gear shift) can be prevented. The second retaining portion 145 allows a thrust force in the direction in which the clutch ring 90 and the drive gear 41 (the transmission gear) engage each other, to act on the protrusion 105, so that gear disengagement whereby the clutch ring 90 moves in the neutral direction to release engagement with the drive gear 41 can be prevented.

Gear disengagement during drive traveling can be prevented by disposing the second retaining portion 145 in the second wall 142 together with the processing of the groove portion 141, and the guide 146 during the processing are formed in the second wall 142, so that the processing for preventing gear disengagement, for example, the processing for disposing slant surfaces with respect to the transmission gear, such as the drive gear 41 and to the teeth (the first teeth 95 and the second teeth 100) of the clutch ring 90 can be unnecessary.

Thus, the processing of components (such as the drive gear 41 and the clutch ring 90) can be simplified while gear disengagement during drive traveling can be prevented.

The present invention has been described above based on the embodiments, but it can be easily inferred that the present invention is not limited to the embodiments and that various modifications can be made within the scope not departing from the purport of the present invention. For example, the number of transmission gears of the transmission 1, the number of the groove portions 73, 131, and 141 and the protrusions 105, and the number of the first teeth 95 and the second teeth 100 can be appropriately set.

In the embodiments, the case where the transmission 1 is mounted on the automobile has been described, but the present invention is not limited to this, and needless to say, the transmission 1 can be mounted on a constructing machine, an industrial vehicle, an agricultural machine and the like. Also in this case, torque loss during gear shift can be eliminated by the transmission 1. As a result, idling of the first shaft 2 (the drive shaft) can be eliminated to improve gas mileage.

In the embodiments, the case where the groove portions 73, 131, and 141 are respectively formed in the hubs 70, 130, and 140 and the protrusions 105 are disposed in the clutch ring 90 has been described, but the present invention is not necessarily limited to this. On the contrary, needless to say, the protrusions 105 can be disposed on the outer circumferential surfaces of the hubs 70, 130, and 140, and the groove portions 73, 131, and 141 can be disposed on the inner circumferential surfaces of the clutch rings 90. Also in this case, by making thrust forces act on the walls of the groove portions 73, 131, and 141 that abut on the protrusions 105, the clutch rings 90 can be moved in the axial direction.

In the embodiments, the case where the protrusions 105 are formed in a cylindrical shape (a circular shape in front view) has been described, but the present invention is not necessarily limited to this. If the protrusions 105 can abut on the walls of the groove portions 73, 131, and 141 to generate component forces in the axial direction (thrust forces), needless to say, the protrusions 105 can be formed in shapes other than the cylindrical shape, such as a polygonal columnar shape such as a square columnar shape, a polygonal pyramid shape such as a square pyramid shape, and a conical shape.

Each of the embodiments may be modified by adding a portion or a plurality of portions of the configuration of another embodiment to the embodiment, or by replacing a portion or a plurality of portions of the configuration of the embodiment with a portion or a plurality of portions of the configuration of another embodiment. For example, the present invention can be appropriately set so that the first retaining portion 134 that has been described in the second embodiment is disposed in the hub 70 according to the first embodiment, and the second retaining portion 145 that has been described in the third embodiment is disposed in the hub 70 according to the first embodiment.

The invention claimed is:

1. A transmission comprising:
   a first shaft to which power is inputted;
   a second shaft that is disposed along the first shaft;
   a plurality of transmission gears that each have a drive gear disposed on the first shaft and a driven gear disposed on the second shaft, the drive gear and the driven gear engaging each other, wherein the drive gear is relatively rotatable with respect to the first shaft or the driven gear is relatively rotatable with respect to the second shaft;

a plurality of hubs that are each disposed on the first shaft so as to be aligned with the drive gear or on the second shaft so as to be aligned with the driven gear and that are each relatively unrotatable with respect to the first shaft or the second shaft;

a clutch ring that is mounted on each of the hubs so as to be relatively movable in the axial direction, that interlocks the drive gear or the driven gear with the hub at a first position in the axial direction, and that moves from the first position to a second position in the axial direction to separate the drive gear or the driven gear and the hub from each other; and an operating portion that moves the clutch ring in the axial direction, wherein one of the hub and the clutch ring has a protrusion that protrudes in the radial direction, wherein the other of the hub and the clutch ring has a groove portion in which the protrusion relatively moves in the rotational direction and in the axial direction, wherein the groove portion has a first wall and a second wall that is opposite to the first wall in the rotational direction, the second wall and the first wall abutting on the protrusion to integrally rotate the hub and the clutch ring, wherein the first wall has a first portion that inclines with respect to the axial direction and that generates a force in the axial direction from the first position toward the second position in the protrusion, wherein the first wall has a first retaining portion that is joined to the first portion and that prevents relative movement of the protrusion from the first position toward the second position during coasting in which power is transmitted from the driven gear to the drive gear, and wherein an angle θ1 between a plane parallel to an axis and the first retaining portion is set to 0°<θ1≤90°.

2. The transmission according to claim 1, wherein the second wall has a second portion that inclines with respect to the axial direction and that generates a force in the axial direction from the second position toward the first position in the protrusion, wherein the second wall has a second retaining portion that is joined to the second portion, that inclines with respect to the axial direction, and that generates a force in the axial direction from the second position toward the first position in the protrusion during drive traveling in which power is transmitted from the drive gear to the driven gear.

3. The transmission according to claim 2, wherein the second retaining portion is disposed so that a boundary between the second portion and the second retaining portion is located toward the second position in the axial direction from a boundary between the first portion and the first retaining portion.

4. The transmission according to claim 1, wherein the operating portion has a biasing portion that provides a biasing force in the axial direction from the second position toward the first position to the clutch ring during drive traveling in which power is transmitted from the drive gear to the driven gear, wherein the position in the axial direction of the protrusion when the clutch ring is moved closest to the drive gear or the driven gear by the operating portion is set to be the same as the position in the axial direction of the first retaining portion.

5. The transmission according to claim 2, wherein the operating portion has a biasing portion that provides a biasing force in the axial direction from the second position toward the first position to the clutch ring during drive traveling in which power is transmitted from the drive gear to the driven gear, wherein the position in the axial direction of the protrusion when the clutch ring is moved closest to the drive gear or the driven gear by the operating portion is set to be the same as the position in the axial direction of the first retaining portion.

6. The transmission according to claim 3, wherein the operating portion has a biasing portion that provides a biasing force in the axial direction from the second position toward the first position to the clutch ring during drive traveling in which power is transmitted from the drive gear to the driven gear, wherein the position in the axial direction of the protrusion when the clutch ring is moved closest to the drive gear or the driven gear by the operating portion is set to be the same as the position in the axial direction of the first retaining portion.

7. The transmission according to claim 2, wherein an angle θ3 between the plane parallel to the axis and the second retaining portion is set to 0°<θ3<90°, and the second retaining portion is circumferentially opposite to the first retaining portion.

8. The transmission according to claim 1, wherein the second wall comprises a guide that leads to the second portion, the guide is circumferentially opposite to the first retaining portion, and a direction of inclination of the guide relative to the axis is different from a direction of inclination of the second portion relative to the axis.

* * * * *